United States Patent [19]
Galecki

[11] Patent Number: 5,444,764
[45] Date of Patent: Aug. 22, 1995

[54] METHOD OF PROVIDING A SUBSCRIPTION LOCK TO A RADIOTELEPHONE SYSTEM

[75] Inventor: Dawn M. Galecki, Barrington, Ill.

[73] Assignee: Motorola, Schaumburg, Ill.

[21] Appl. No.: 86,407

[22] Filed: Jul. 1, 1993

[51] Int. Cl.⁶ .................................... H04M 11/00
[52] U.S. Cl. ................................. 379/58; 379/357
[58] Field of Search ............. 379/58, 63, 357, 95, 379/59, 144, 91

[56] References Cited

U.S. PATENT DOCUMENTS

| | | | |
|---|---|---|---|
| 5,181,238 | 1/1993 | Medamana et al. | 379/95 |
| 5,237,612 | 8/1993 | Raith | 379/59 |
| 5,257,414 | 10/1993 | Trahan et al. | 379/357 |
| 5,266,782 | 11/1993 | Alanärä | 379/144 |

OTHER PUBLICATIONS

Rahnema, M., "Overview of the GSM System and Protocol Architecture" *IEEE Communications Magazine*, vol.: 31 Iss: 4 pp. 92–100 Apr., 1993.

Vedder, K., "Smart Cards" CompEuro 1992 Proceedings Computer Systems and Software Engineering (Cat No. 91CH3121-1) pp. 630–635 1992 (Conf. Date May 4–8, 1992).

*Primary Examiner*—Curtis Kuntz
*Assistant Examiner*—Michael B. Chernoff
*Attorney, Agent, or Firm*—Kirk W. Dailey

[57] ABSTRACT

A radiotelephone system (100) includes a radiotelephone (103) having a subscription lock and a removable subscriber identification module (SIM) card (105) containing an international mobile subscriber identification (IMSI). The subscriber lock is used to restrict registration into the radiotelephone system (100) to only those radiotelephones which contain a SIM card which has an IMSI which falls within a range of valid IMSIs programmed into the radiotelephone or the user has entered a subsidy flag personal identification number (PIN) for permanently disabling the need for a valid IMSI.

4 Claims, 3 Drawing Sheets

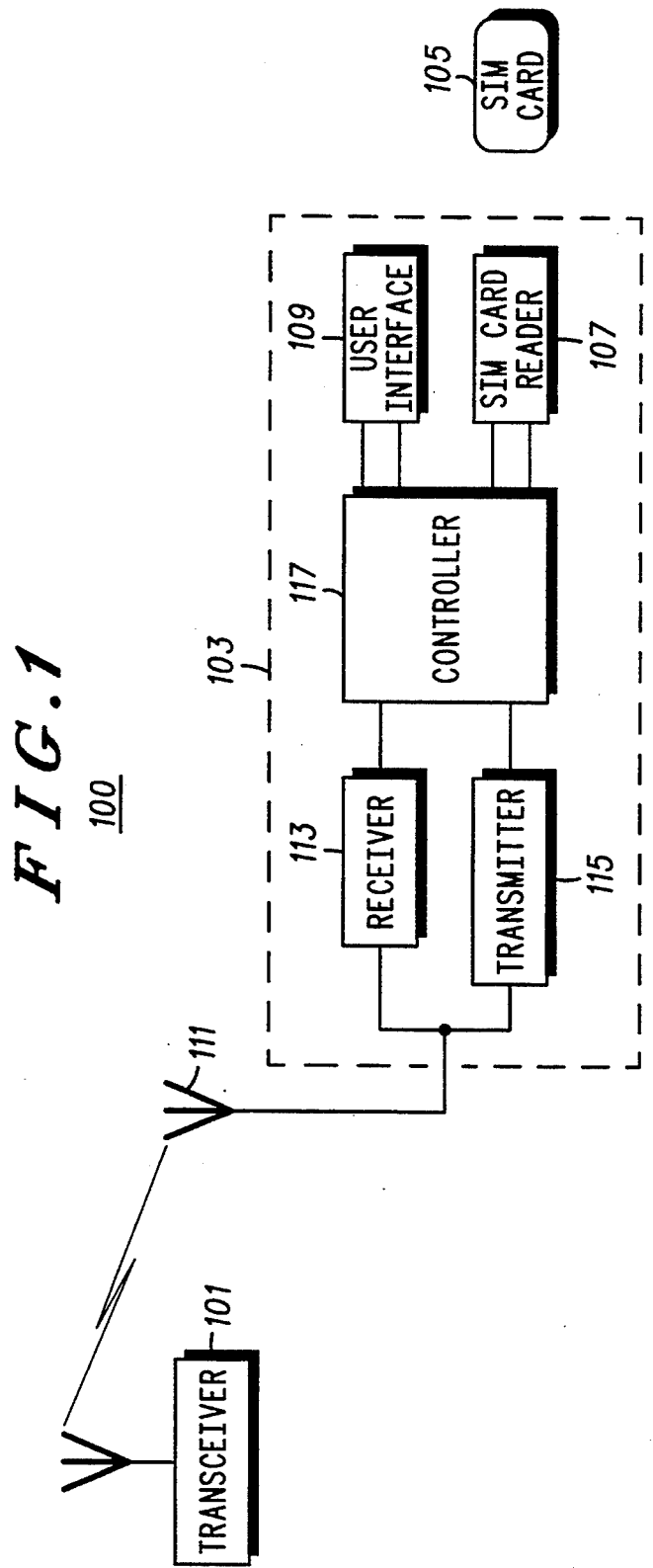

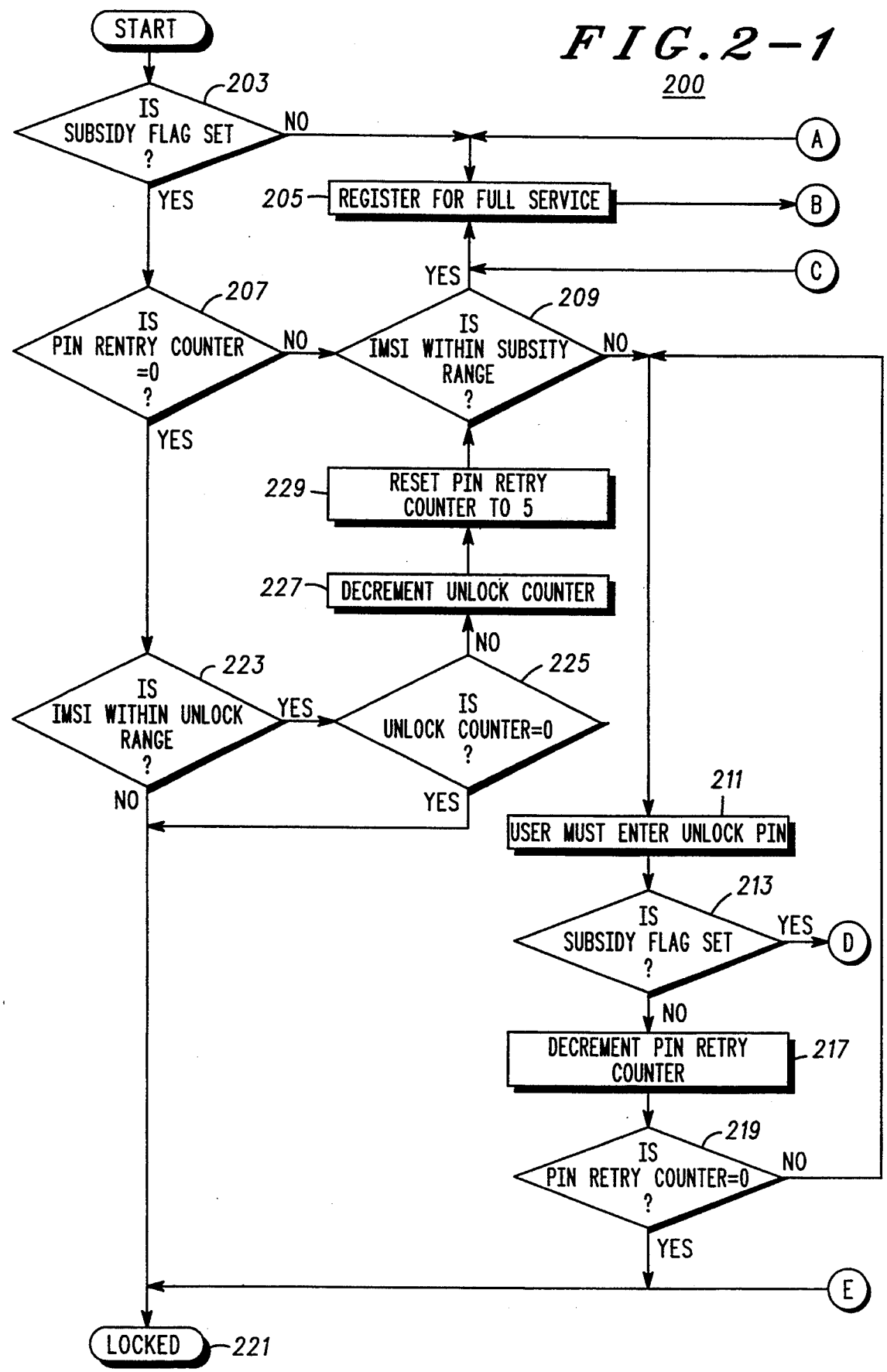

METHOD OF PROVIDING A SUBSCRIPTION LOCK TO A RADIOTELEPHONE SYSTEM

FIELD OF THE INVENTION

Generally, this invention relates to radiotelephones which use subscriber identification module (SIM) cards for identification purposes, and more specifically, to a method of allowing access to a radiotelephone system using a particular SIM card and a particular radiotelephone.

BACKGROUND OF THE INVENTION

In current radiotelephone systems such as the Global System for Mobile Communications (GSM) radiotelephone system currently in use in Europe, a SIM card is inserted into a radiotelephone for providing subscriber identification, billing information and other information concerning the operation of the radiotelephone. In the GSM system, the same hardware can be used with any SIM card inserted into the SIM card reader of the radiotelephone.

Additionally, telephone system operators generally like to provide subsidized telephones for loyal customers. Ideally, a subscriber could obtain a subsidized phone in return for a promise to use a telephone system's service for a certain predetermined amount of time. However, since all the subscriber information is contained on the SIM card, there is no manner in which a telephone system operator may tie the subsidized telephone to a particular subscriber. Thus, the subscriber is free to obtain a subsidized phone from a first system operator and obtain service from a second system operator. Consequently, it would be advantageous to tie a particular SIM card to a particular radiotelephone for a predetermined amount of time to provide a manner for telephone system operators to provide subsidized radiotelephones to their customers.

BRIEF DESCRIPTION OF THE DRAWINGS

FIG. 1 is an illustration in block diagram form of a radiotelephone system in accordance with the present invention.

FIGS. 2-1 and 2-2 is a process flow chart of a method in accordance with the present invention.

DESCRIPTION OF A PREFERRED EMBODIMENT

Figure 2:
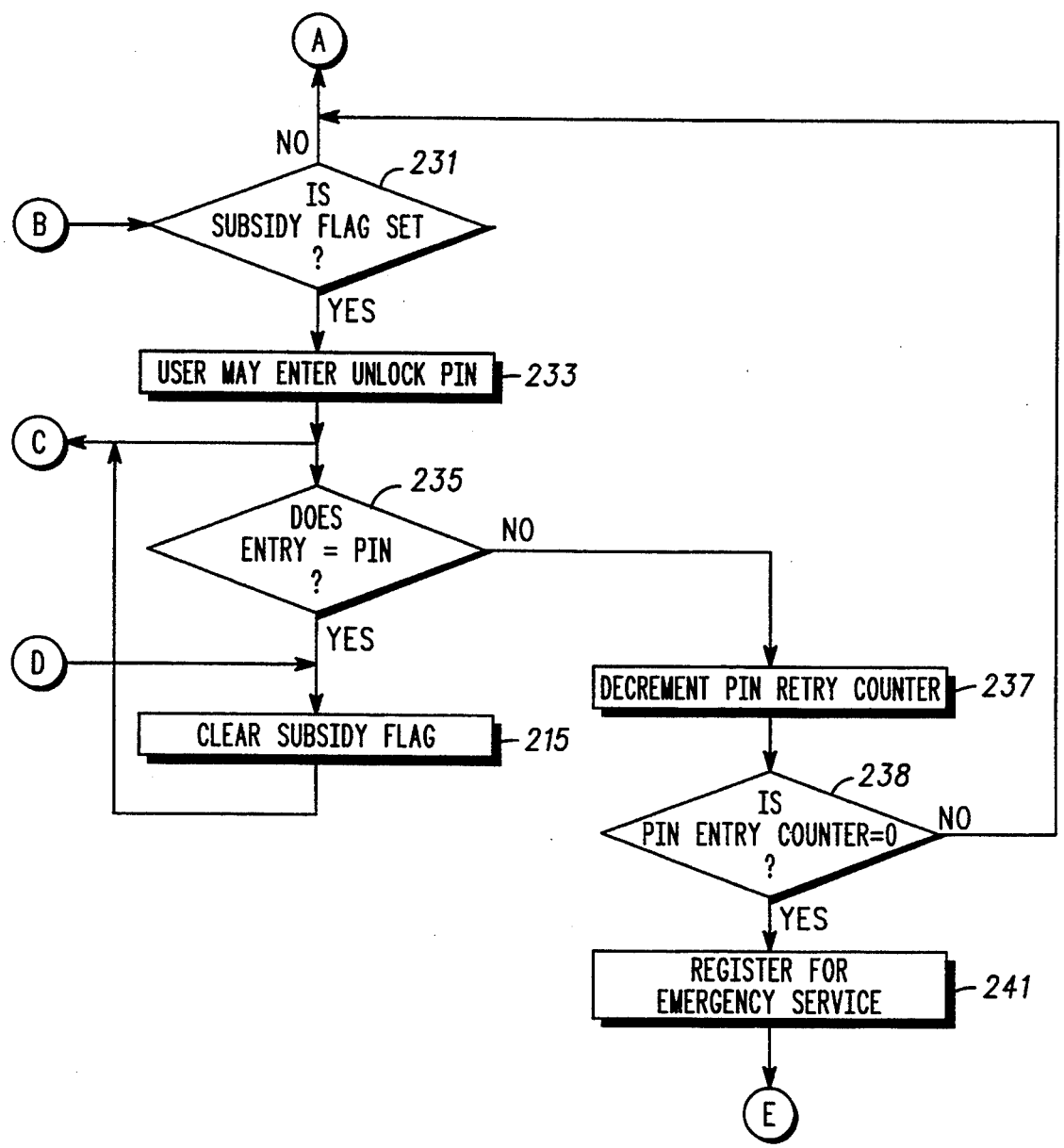

Generally, this invention encompasses a lock for restricting registration onto a radiotelephone system to only those radiotelephones which contain a SIM card which has a international mobile subscriber identification (IMSI) which falls within a range of valid IMSIs programmed into the radiotelephone or the user has entered a subsidy flag personal identification number (PIN) for permanently disabling the need for a valid IMSI. This function allows the radiotelephone hardware to be tied to particular SIM cards which contains one of a valid range of IMSIs.

With use of this lock, commonly known as a subscription lock, a radiotelephone system operator may offer subsidized phones to its subscribers with confidence that the subscriber will use only the SIM card offered by the system operator for a predetermined time period. After the expiration of the predetermined time period, the system operator can send the subsidy flag PIN to the subscriber for permanently disabling the need for a valid IMSI.

FIG. 1 is an illustration in block diagram form of a radio telephone system in accordance with the present invention. In the radio telephone system, a remote transceiver 101 sends and receives radio frequency (RF) signals to and from mobile and portable radio telephones within a fixed geographic area served by the remote transceiver 101. Radio telephone 103 is one such radio telephone served by the remote transceiver 101. In the preferred embodiment the radiotelephone 103 is a Personal Communication Network (PCN) radiotelephone, model #S3267AAB available from Motorola, Inc.

Upon power-up of the radiotelephone 103, a SIM card 105 is inserted by the user into the SIM card reader 107 contained within the radiotelephone 103. Upon insertion of the SIM card 105, the radiotelephone 103 prompts the user through the user interface 109 to insert a personal identification number (PIN) to unlock the SIM card allowing access to the subscriber information contained therein. In other embodiments, the SIM card may not require the entry of a PIN number to unlock the subscriber information contained therein. However, the SIM card access PIN should not be confused with the subsidy flag PIN subsequently described. Upon entering the SIM card access PIN, the radiotelephone 103 executes the process 200 illustrated in FIG. 2 and subsequently described in detail. After successfully completing the process 200, a radiotelephone 103 is fully registered for service in the radiotelephone system 100 of FIG. 1. The radiotelephone 103 is now able to send and receive RF signals from the remote transceiver 101.

While receiving RF signals from the remote transceiver 101, the radio telephone 103 uses the antenna 111 to couple the RF signals and to convert the RF signals into electrical RF signals. The electrical RF signals are received by the radio receiver 113 for use within the radio telephone 103. The receiver 113 demodulates the received electrical RF signals and outputs a symbol signal for use by the controller 117. The controller 117 formats the symbol signal into voice or data for use by the user interface 109. The controller 117 includes a microprocessor, such as a MC68332 available from Motorola, Inc., and memory devices such as RAM and EEPROM. The user interface 109 is used to convey information between a user and the radio telephone 103, typically including a microphone, a speaker, a display, a data port and a keypad.

Upon the transmission of RF signals from the portable radio telephone 103 to the remote transceiver 101, the voice and/or data signals from the user interface 109 are processed by the controller 117. The processed signals are input into the transmitter 115. The transmitter 115 converts the data into electrical RF signals. The electrical RF signals are converted into RF signals and output by the antenna 111. The RF signals are received by the remote transceiver 101 and converted for use with a land line telephone system.

FIGS. 2-1 and 2-2 is an illustration of a process flow chart which describes a method for controlling access to a radiotelephone system. The process illustrated in FIGS. 2-1 and 2-2 is implemented in software in an MC68332 microprocessor available from Motorola, Inc., which is embedded in the controller 117.

Prior to executing the process 200, the following values are initialized by the manufacturer and remain valid for the life of the phone: a PIN retry counter is set to 5, an unlock counter is set to 5, a range of valid international mobile subscriber identifications are set, a PIN register is set to a predetermined PIN value and a subsidy flag is either set to 0 or 1 indicating an active subsidy flag, or an inactive subsidy flag. The preceding values are used in the preferred embodiment, however, they may be adjusted for a particular application of the present invention.

The process 200 begins at 201 when the phone is registered for emergency service only. At decision block 203, the process checks the value of the subsidy flag. When the value of the subsidy flag is equal to zero, then the subsidy flag is not set, and the radiotelephone 103 registers for full service within the radiotelephone system 100 at function block 205. If the subsidy flag is set, then the process compares the value of the PIN retry counter to zero at decision block 207. If the PIN retry counter is not equal to zero, then the process checks to see if the international mobile subscriber identification falls within the subsidy range of valid IMSIs at decision block 209. If the SIM is within the subsidy range, then the radiotelephone 103 registers for full service in the radiotelephone system 100 of FIG. 1 at function block 205. If the SIM falls outside the subsidy range of valid SIMs, then the process requests the user to enter a subsidy flag PIN at function block 211. At decision block 213, the process compares the subsidy flag PIN entered by the user to a predetermined PIN value stored within the EEPROM in the controller 117 of the radiotelephone 103 of FIG. 1. If the subsidy flag PIN entered by the user equals the predetermined PIN value, then the subsidy flag is cleared at function block 215 and the radiotelephone is registered for full service in the radiotelephone system 100 of FIG. 1 at function block 205. If the subsidy flag PIN entered by the user is not equal to the predetermined PIN value, then the PIN retry counter is decremented by 1 at function block 217. At decision block 219 the current value of the PIN retry counter is compared to zero. If the PIN retry counter is not equal to zero then the process returns to function block 211 which requests a user to enter a subsidy flag PIN. If the PIN retry counter value is equal to zero, then the phone becomes locked at function block 221.

At the beginning of the process 200, if the subsidy flag is set at decision block 203 and the PIN retry counter is equal to zero at decision block 207, then the process checks to see if the SIM falls within an unlock range at decision block 223. The unlock range differs from the subsidy range and is used to reset the PIN retry counter to 5. At decision block 225, the unlock counter value is compared to zero. If the unlock counter value is equal to zero, then the phone is locked and must be returned to the manufacturer for a resetting of the unlock counter and the PIN retry counter. If the unlock counter value is not equal to zero, then the unlock counter value is decrimented at function block 227 and the PIN retry counter value is reset to 5 at function block 229. The process then returns to decision block 209 which checks to see if the SIM falls within the subsidy range which is not likely since the subsidy range in the preferred embodiment differs from the unlock range. In order for the phone to return to operation a new SIM card would need to be entered with a SIM which falls within a subsidy range.

During normal operation after the radiotelephone 103 has been registered for full service at function block 205, the user may enter a sequence to access a subsidy PIN unlock mode to clear the subsidy flag for future use. Upon accessing this mode, the process checks to see if the subsidy flag is set at decision block 231. If the subsidy flag is not set then the phone returns to a full service at function block 205. If the subsidy flag is set, then the user is requested to enter a subsidy flag PIN at function block 233. The subsidy flag PIN entered by the user is compared to the predetermined PIN value at decision block 235. If the entered subsidy flag PIN equals the predetermined PIN value then the subsidy flag is cleared at function block 215. If the subsidy flag PIN entered does not equal the predetermined PIN value then the PIN retry counter is decremented at function block 237. At decision block 239, the PIN retry counter value is compared to zero. If the PIN retry counter value is equal to zero, then the radiotelephone 103 is registered for emergency service at function block 241 and is locked from any further functions at function block 221. PIN retry counter value is not equal to zero then the radiotelephone 103 returns to full service operation at function block 205.

When the phone is locked at function block 221, the phone's keypad is inaccessible and the radiotelephone is not registered in the radiotelephone system 100 of FIG. 1. Restricting registration of the phone ensures that the subscriber will not be able to access features of the radiotelephone system through either the keypad or any peripheral devices (facsimile machines etc) which may be attached to the data port contained in the user interface 109 of the radiotelephone 103. Addititionally, restricting registration of the radiotelephone saves resources in the radiotelephone system 100 for use by other radiotelephones.

What is claimed is:

1. In a radiotelephone system, a radiotelephone having a subscription lock, the subscription lock having a predetermined range of valid international mobile subscriber identifications (IMSIs), a predetermined subsidy flag personal identification number (PIN) and responsive to a subscriber providing a subscriber identification module (SIM) card containing an IMSI, a method of providing the subscription lock comprising the steps of:
   comparing the SIM card IMSI to the permanent range of valid IMSIs;
   comparing, responsive to failing to provide a SIM card containing an IMSI within the predetermined range of valid IMSIs, a user input subsidy flag PIN to the predetermined subsidy flag PIN;
   restricting access to the radiotelephone system responsive to the user input subsidy flag PIN failing to equal the predetermined subsidy flag PIN; and
   accessing the radiotelephone system using the SIM card IMSI.

2. A method of controlling access of a radiotelephone in a radiotelephone system, the radiotelephone having a subscriber identification module (SIM) card containing a international mobile subscriber identification (IMSI), the method comprising the steps of:
   a) setting a value of a Personal Identification Number retry counter to 5;
   b) setting a value of an unlock counter to 5;
   c) setting a subsidy range of valid IMSIs;
   d) setting a PIN register to a predetermined PIN value;
   e) setting a subsidy flag to a predetermined state chosen from a group consisting of an active state and an inactive state;

f) comparing the state of the subsidy flag to the active state;

g) comparing, responsive to the subsidy flag in the active state, the value of the PIN retry counter to zero;

h) checking, responsive to the PIN retry counter not equal to zero, if the IMSI falls within the subsidy range of valid IMSIs;

i) requesting, responsive to the IMSI falling outside the subsidy range of valid IMSIs, a user to enter a PIN;

j) comparing the PIN to the predetermined PIN value;

k) setting, responsive to the PIN equaling the predetermined PIN value, the subsidy flag equal to 0;

k) decrementing, responsive to the step j determining the PIN is not equal to the predetermined PIN value, the value of the PIN retry counter;

l) comparing the value of the PIN retry counter to zero;

m) repeating, responsive the value of the PIN retry counter not equal to zero, steps i-k, the invention being characterized in the step of;

n) restricting, responsive to the value of the PIN retry counter equal to zero, a registration of the radiotelephone in the radiotelephone system o) registering the radiotelephone in the radiotelephone system using the IMSI of the SIM card.

3. In a radiotelephone system, a radiotelephone having a subscription lock, the subscription lock having a plurality of permanent valid international mobile subscriber identifications (IMSI), a permanent subsidy flag PIN, and responsive to a subscriber providing a subscriber identification module (SIM) card containing an IMSI, the method of providing a subscription lock comprising the steps of:

reading the SIM card IMSI;

comparing the SIM card IMSI to the plurality of permanent valid IMSI;

comparing, responsive to the SIM card IMSI not equaling any of the plurality of permanent valid IMSIs, a user input subsidy flag PIN to the predetermined subsidy flag PIN;

restricting access to the radiotelephone system responsive to the user input subsidy flag PIN failing to equal to the permanent subsidy flag PIN; and accessing the radiotelephone system using the SIM card IMSI.

4. A method of controlling access to a radiotelephone system, the radiotelephone system including a radiotelephone having a plurality of predetermined valid identification numbers and a predetermined valid subsidy flag personal identification number (PIN), the method executed in the radiotelephone and comprising the steps of:

accepting a subscriber identification module (SIM) card, the SIM card containing a first identification number;

comparing the first identification number to the plurality of predetermined valid identification numbers;

requesting, responsive to the step of comparing resulting in the first identification number not equal to the plurality of predetermined valid identification numbers, a user to enter a user personal identification number (PIN);

comparing the user PIN to the predetermined valid subsidy flag PIN:

restricting, responsive to the user PIN not equaling the predetermined valid subsidy flag, a registration of the radiotelephone in the radiotelephone system: and registering the radiotelephone in the radiotelephone system using the first identification number.

* * * * *

UNITED STATES PATENT AND TRADEMARK OFFICE
CERTIFICATE OF CORRECTION

PATENT NO. : 5,444,764
DATED : August 22, 1995
INVENTOR(S) : Galecki, Dawn M.

It is certified that error appears in the above-indentified patent and that said Letters Patent is hereby corrected as shown below:

In the Drawings:

<u>In Figure 2-1:</u>

Box 209 change SUBSITY to SUBSIDY

Box 213 should read: DOES PIN ENTRY = PIN?

<u>In Figure 2-2:</u>

Box 238 change ENTRY to RETRY

Signed and Sealed this

Sixteenth Day of December, 1997

*Attest:*

BRUCE LEHMAN

*Attesting Officer*      *Commissioner of Patents and Trademarks*